Aug. 11, 1925.
A. H. KORT, JR
1,549,670
SEED DRILL
Filed Dec. 8, 1923
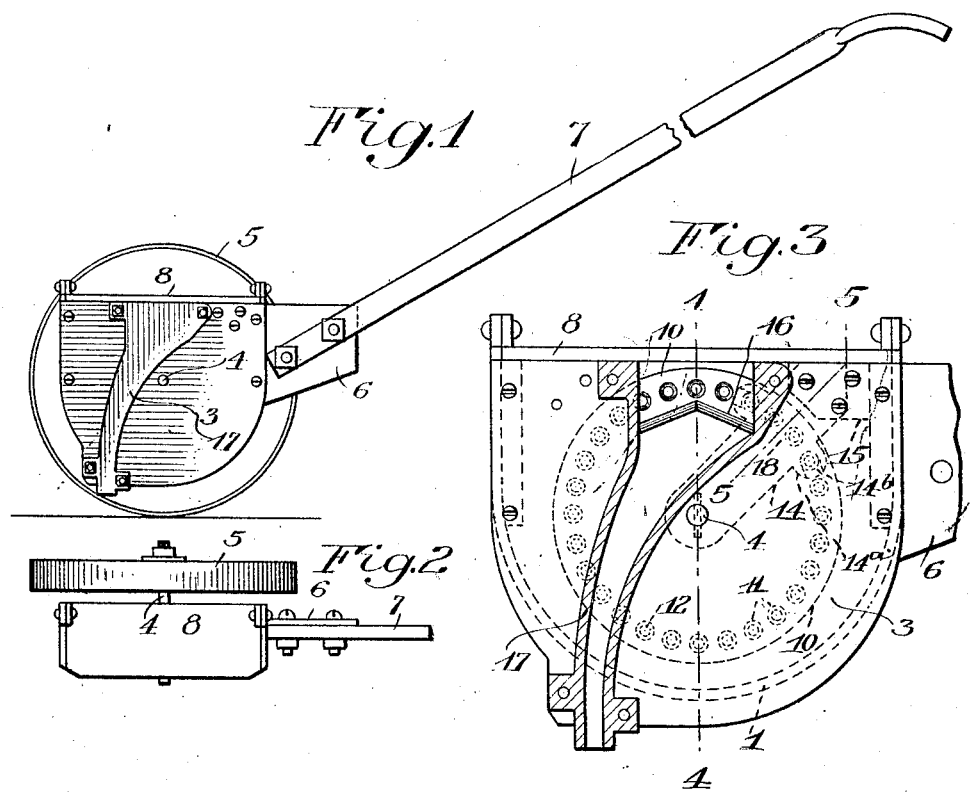
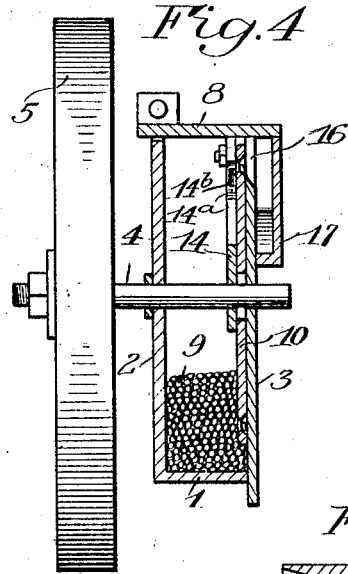
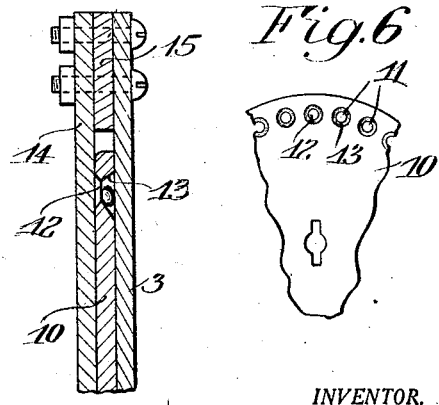
INVENTOR.
Adolph H. Kort, Jr.
BY Harold E. Stonebraker
his ATTORNEY Patented Aug. 11, 1925.

1,549,670

UNITED STATES PATENT OFFICE.

ADOLPH H. KORT, JR., OF IRONDEQUOIT, NEW YORK.

SEED DRILL.

Application filed December 8, 1923. Serial No. 679,390.

*To all whom it may concern:*

Be it known that I, ADOLPH H. KORT, Jr., a citizen of the United States of America, residing at Irondequoit, in the county of Monroe and State of New York, have invented certain new and useful Improvements in Seed Drills, of which the following is a specification.

My invention relates to a seed drill, and more particularly to a manually operated drill for planting radish seed.

One object of the improvement is to afford a simple and economical construction which will distribute seed uniformly and evenly.

Another purpose of the invention is to provide a structure which can be readily operated and will eliminate practically all danger of crushing or breaking the seed, thereby insuring maximum results from a given quantity of seed.

Still a further object of my improvement is to afford a construction that is positive in its operation, and which insures dropping a seed at regular intervals without any chance of clogging the machine or stopping its operation.

To these ends, the invention comprises the structure which will appear clearly from the following description, when read in conjunction with the accompanying drawings, the novel features being pointed out in the claims following the description.

In the drawings:

Figure 1 is a side elevation of a seed drill embodying my invention, in one practical form;

Figure 2 is a plan view with the handle broken away;

Figure 3 is an enlarged side elevation similar to Figure 1, with the outer wall of the discharge chute removed;

Figure 4 is a sectional view on line 4—4 of Figure 3;

Figure 5 is a sectional view on line 5—5 of Figure 3, and

Figure 6 is a detail view of the carrier plate with parts broken away.

Referring more particularly to the drawings, the seed hopper comprises a bottom wall 1 and side walls 2 and 3, and is suitably journalled on an axle 4 which has fixedly mounted thereon a ground wheel 5 arranged in close proximity to the hopper so that the drill occupies a minimum space in its travel across a bed. The hopper also includes a stationary bracket or extension 6, which carries a handle 7, by means of which the operator pulls the drill across the bed.

8 designates a hinged cover, which is lifted to permit loading the hopper with the seed 9. Arranged within the hopper and fixedly mounted on the axle 4 is a carrier, preferably in the form of a plate 10, which rotates in a vertical plane about a horizontal axis, as shown in Figure 4. The carrier plate is provided with a series of circularly arranged openings 11, each of which has a constricted portion 12 between the opposite sides of the plate, as shown in Figure 5. The walls bounding the opening are preferably bevelled on both sides of the constricted portion 12, which latter is arranged nearer the inlet side of the plate than the outlet side, so as to form a pocket 13 at the outside, which retains the seed resting against the wall 3, after it once enters the carrier plate, as illustrated in Figure 5. Each pocket 13 is so formed that when at its uppermost position, it has a greater bevel on its lower side than its upper side, so as to permit the seed to fall readily from the carrier plate.

The carrier plate 10 is located in juxta-relation to the outer wall 3 of the hopper, and is held in close relationship thereto by a retaining plate 14 which is suitably attached against a spacing plate 15 as shown in Figure 5, and extends radially of the carrier plate to the center thereof, the axle 14 passing through the retaining plate. The function of the retaining plate 14 is primarily to hold the carrier plate in proper relationship, and prevent any twisting of the latter, or its separation from the wall 3 of the hopper. The retaining plate carries a pair of integral extensions 14$^a$, which overlie the carrier plate, each extension being provided with a deflecting or guiding surface 14$^b$, which acts to engage an abnormally large seed and force it through the carrier plate.

The wall 3 is cut away at its upper portion, as indicated at 16, to permit release of the seed from the carrier plate 10, and 17 is a discharge chute arranged on the outer surface of the wall 3 and communicating with said opening 16.

In the operation of the mechanism, by pulling the device along over the ground, the wheel 5, axle 4 and carrier plate 10 are caused to turn with reference to the hopper, which maintains a horizontal position, as it moves over the ground. The seed 9 in the hopper enter the openings at the bottom of the carrier plate and become lodged in the pockets or recesses 13, as shown in Figure 5, where they are retained by the wall 3 of the hopper. As the carrier plate rotates, the openings 11 successively reach the opening 16 in the side wall 3, whereupon the seed in each pocket is released and falls through the opening into the discharge chute, whence it drops to the ground. If an unusually large seed enters the opening in the carrier plate and does not readily fall into the opening 16, it is engaged by one of the extensions 14ª, and pushed through the carrier plate thereby.

While I have described the invention with reference to a specific mechanism, it is not confined to the details set forth, and this application is intended to cover such modifications or changes as may come within the intent of my improvement or the scope of the following claims.

I claim:

1. A seed dispensing mechanism comprising a hopper, a carrier plate rotating in said hopper about a horizontal axis and having a series of circularly arranged openings permitting the passage of seed therethrough, a discharge chute communicating with the hopper at its upper portion, each of said openings in the carrier plate having a constricted portion toward the inlet side of the plate and being reversely flared from said constricted portion toward both sides of the plate, and a rotary shaft passing through the hopper and fixedly connected to said carrier plate.

2. A seed dispensing mechanism comprising a hopper with side walls, a carrier plate rotating within said hopper about a horizontal axis and juxtaposed with reference to one of the side walls, a radially arranged retaining plate juxtaposed with reference to the opposite side of the carrier plate, the latter having a series of circularly arranged openings permitting the passage of seed therethrough, a discharge chute communicating with the carrier plate at the upper part of the hopper, each of said openings in the carrier plate having a constricted portion toward the inlet side of the plate and being reversely flared from said constricted portion toward both sides of the plate, and a shaft passing through the hopper and having fixed connection with the carrier plate.

In witness whereof, I have hereunto signed my name.

ADOLPH H. KORT, Jr.